A. WHYTE.
SPRING SECURING DEVICE.
APPLICATION FILED AUG. 21, 1916.
1,238,237.
Patented Aug. 28, 1917.
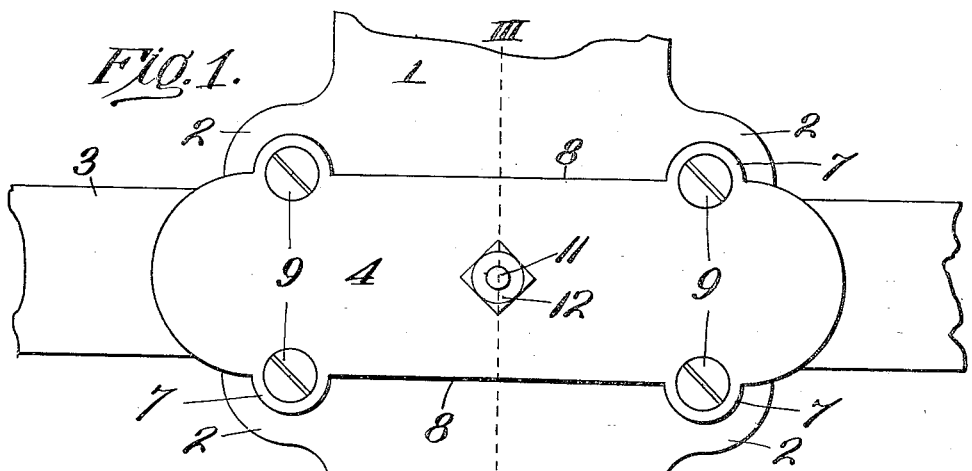
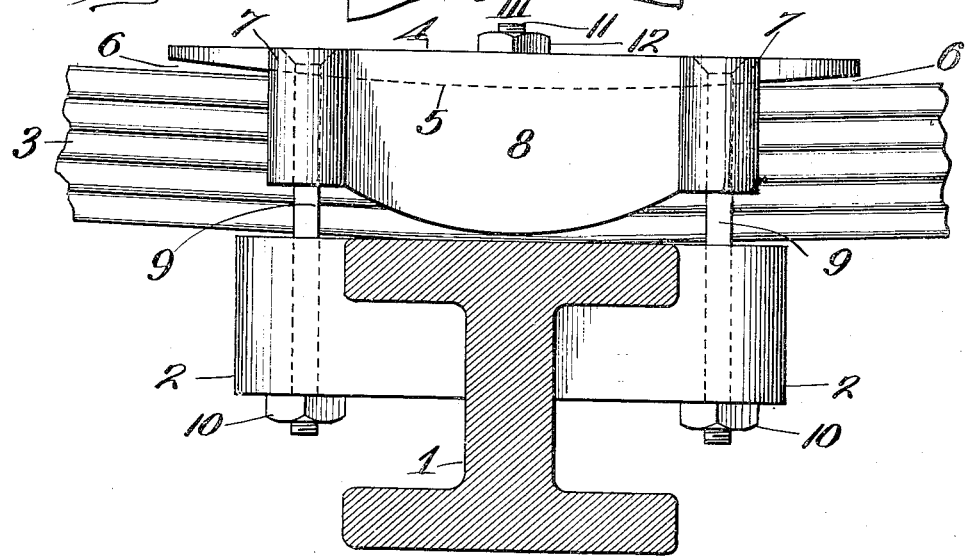
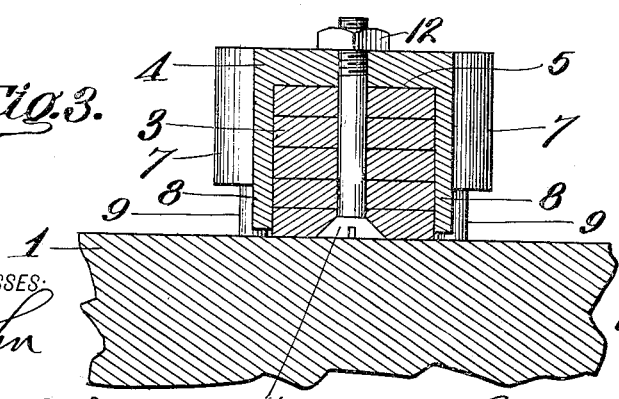
WITNESSES:
M. C. Bohn
[signature]
INVENTOR
Alex Whyte,
BY
George J. Thorpe
ATTORNEY

UNITED STATES PATENT OFFICE.

ALEXANDER WHYTE, OF TWIN FALLS, IDAHO.

SPRING-SECURING DEVICE.

1,238,237.     Specification of Letters Patent.     Patented Aug. 28, 1917.

Application filed August 21, 1916. Serial No. 116,200.

*To all whom it may concern:*

Be it known that I, ALEXANDER WHYTE, a citizen of the United States, residing at Twin Falls, in the county of Twin Falls and State of Idaho, have invented certain new and useful Improvements in Spring-Securing Devices, of which the following is a specification.

This invention relates to automobile spring securing devices and more especially to devices for securing the front springs in position, my object being to produce devices which will hold the springs flatly upon the axles and thus guard against upward bowing or buckling movement of the portions of the springs which contact with the axles.

A further object is to produce simple, strong, durable, and inexpensive devices which can be easily and quickly secured in or removed from position.

To these ends the invention consists in certain novel and peculiar features of construction and organization of parts as hereinafter described and claimed; and in order that it may be fully understood, reference is to be had to the accompanying drawing, in which:

Figure 1 is a fragmentary top plan view of an axle and front spring secured together by devices embodying my invention.

Fig. 2, is a view showing the axle in cross section and the spring and securing device in side elevation.

Fig. 3, is a vertical section taken on the line III—III of Fig. 1.

Before proceeding with a detailed description of the invention, it is desirable to state that the common method of securing a spring across the front axle of an automobile, is by means of U-bolts or clips fitting astride the spring at opposite sides of the axle and extending through the side lugs or flanges of the axle, nuts engaging the legs of the bolts or clips and the under sides of said lugs or flanges to clamp the spring firmly upon the axle. With this construction, that part of the spring lying upon the axle between the U-bolts or clips tends to bow or buckle upward and flatten downward as the load on the ends of the spring fluctuate under the travel of the car, this buckling and unbuckling operation weakening the spring to such extent that breakage is frequent at the point mentioned.

Referring now to the drawings in detail, 1 is the front axle of an automobile provided with the customary vertically-perforated lugs or flanges 2, for the reception of the securing bolts hereinafter described, and 3 indicates one of the front springs extending transversely of the axle and said lugs or flanges, said spring being shown as of the customary leaf type.

4 is a plate resting upon the spring and extending longitudinally thereof, the lower side of the plate being convex at its under side as at 5 so as to bear firmly upon the spring vertically above the longitudinal center of the axle and diverge upwardly from the spring at opposite sides of the longitudinal center of the axle to produce the spaces or openings 6 to accommodate vertical play of the spring.

The plate 4 is provided above the lugs or flanges 2 with vertically-perforated side lugs 7, and between said side lugs with depending stiffening or strengthening flanges 8 engaging the opposite sides of the spring.

9 are vertical bolts extending through the lugs 7 and 2 and countersunk at their upper or headed ends in said lugs 7 and engaged at their lower ends by clamping nuts 10 bearing against the under sides of the lugs or flanges 2, the arrangement being such that the plate is caused to clamp the spring centrally of its length firmly and flatly down upon the axle in the plane of the longitudinal center thereof.

To guard against longitudinal movement or creepage of the spring across the axle, a bolt 11 extends through the spring and plate 4, the head of the bolt being preferably countersunk in the lower leaf of the spring, and a clamping nut 12 engaging the upper end of the bolt and the upper side of plate 4.

With the construction described it will be apparent that the buckling and unbuckling movement of the spring upon the axle and between the clamping bolts is prevented and that consequently the life of the spring is materially lengthened.

From the above description, it will be apparent that I have produced devices for securing automobile springs to axles embodying the features of advantage enumerated as desirable in the statement of the object of the invention, and while I have illustrated and described the preferred embodiment of the invention, it is to be understood that it is susceptible of modification in minor particulars without departing from the spirit and scope of the appended claims.

I claim:

1. The combination with an automobile axle and a spring extending transversely of and resting on said axle, of a plate resting upon the spring; the plate being convex longitudinally at its under side and bearing at the center only of the convex surface upon the spring vertically above the longitudinal center of the axle, means connecting the plate to the axle forward and rearward of the center of said convex surface of the plate, and means preventing longitudinal creepage of the spring between the plate and axle.

2. The combination with an automobile axle and a spring extending transversely of and resting on said axle, of a plate resting upon the spring; the plate being convex longitudinally at its under side and bearing at the center only of the convex surface upon the spring vertically above the longitudinal center of the axle, said plate having vertically-perforated side lugs near its ends and depending side flanges between the corresponding side lugs, and bolts extending through said perforated lugs and secured to the axle to cause the plate to clamp the central portion of the spring firmly down upon the axle.

In testimony whereof I affix my signature in the presence of two witnesses.

ALEXANDER WHYTE.

Witnesses:
CHARLES C. JOHNSON,
ERIC T. JOHNSON.